(12) United States Patent
Yada

(10) Patent No.: US 6,215,833 B1
(45) Date of Patent: Apr. 10, 2001

(54) DIGITAL SIGNAL PROCESSING CIRCUIT

(75) Inventor: Hiroaki Yada, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/963,122

(22) Filed: Oct. 28, 1997

Related U.S. Application Data

(63) Continuation of application No. 08/552,169, filed on Nov. 2, 1995, now abandoned, which is a continuation of application No. 08/016,098, filed on Feb. 10, 1993, now abandoned.

(30) Foreign Application Priority Data

Feb. 14, 1992 (JP) .................................................. 4-059711

(51) Int. Cl.[7] .............................. H04L 25/40; H03D 3/24
(52) U.S. Cl. ........................................... 375/372; 375/374
(58) Field of Search ................................... 375/230, 231, 375/232, 371, 374, 362, 340, 363, 369, 355; 364/247.2, 255.1, 193, 255.8, 148, 964.25, 166; 395/828.41; 360/72.2; 369/47, 48, 60

(56) References Cited

U.S. PATENT DOCUMENTS 5,146,477 * 9/1992 Cantoni et al. ....................... 375/363
5,291,468 * 3/1994 Carmon et al. ........................ 369/47

OTHER PUBLICATIONS

Cotton et al., "Dual–Ported Four–Sector File Buffer", IBM Technical Disclosure Bulletin, vol. 19, No. 10, p. 3635–7, Mar. 1977.*

* cited by examiner

Primary Examiner—William Luther
(74) Attorney, Agent, or Firm—Sonnenschein, Nath & Rosenthal

(57) ABSTRACT

A digital signal processing circuit comprising a memory means for storing a digital signal obtained from a playback channel; a control means for writing the digital signal in the memory means at a first rate and reading out the digital signal from the memory means at a second rate lower than the first rate; and a processing means for executing a desired process relative to the digital signal thus read out from the memory means. The digital signal is written in the memory means at a first rate by the memory control means and is read out therefrom at a second rate lower than the first rate. And then a desired signal process is executed relative to the digital signal read out from the memory means. Therefore the required digital processing rate becomes lower than the transmission rate of the playback channel, whereby the transmission rate can be raised despite the condition that the time required for the desired signal process such as demodulation is rendered longer.

8 Claims, 6 Drawing Sheets

DIGITAL SIGNAL PROCESSING CIRCUIT

This application is a continuation of Ser. No. 08/552,169 filed Nov. 2, 1995, now abandoned which is a continuation of Ser. No. 08/016,098 filed Feb. 10, 1993, now abandoned.

BACKGROUND OF THE INVENTION

1. Field of the Invention

The present invention relates to a digital signal processing circuit adapted for use in a data demodulator of a magnetic disk recording/playback apparatus or the like.

2. Description of the Prior Art

FIG. 5 is a block diagram of a conventional data demodulator with a level tracking loop employed in a magnetic disk recording/playback apparatus as disclosed in U.S. patent application Ser. No. 07/963,905 (filed Oct. 20, 1992). The data demodulator comprises an A-D converter 11 for converting into a digital signal the output signal of an analog AGC amplifier which receives the output of a playback amplifier (denoted by reference numeral 44 in FIG. 4) and produces a signal of a fixed envelope level; an equalizer (FIR filter) 14 for equalizing the output signal of the A-D converter 11; a digital PLL circuit 16 for extracting a 0° phase clock signal from the output Sk of the equalizer 14 and producing 0° phase data which represents the phase Pk of a data existence point; a 0° phase sample interpolator 15 supplied with the respective outputs of the equalizer 14 and the digital PLL circuit 16 and producing a signal amplitude level $S_{Ok}$ at the data existence point (0° phase); a level tracking loop 17 supplied with the signal amplitude level $S_{Ok}$ from the interpolator 15 and producing a 0° phase signal level average when the noise component included in the playback signal is averaged; and a Viterbi decoder 18 for producing detection data dk by executing maximum likelihood decode and decision of the data on the basis of both the signal amplitude level $S_{Ok}$ outputted from the interpolator 15 and the 0° phase signal level average outputted from the level tracking loop 17.

Since the output $S_{Ok}$ of the interpolator 15 is delivered once per sampling interval Ts, merely one of two samples corresponds to a 0° phase on the average. An effective signal Vk is supplied from the digital PLL circuit 16 to the Viterbi decoder 18 so as to serve as a signal which signifies whether the output $S_{Ok}$ of the interpolator 15 has a 0° phase amplitude level for decision of the data. The Viterbi decoder 18 is required to execute its operation of data decision merely when Vk=1.

The A-D converter 11 samples the analog playback signal from the AGC amplifier at a sampling frequency fs which is a predetermined multiple of the channel bit rate, and quantizes the sampled signal to have a predetermined signal word length. For example, the sampling frequency fs is set to a double of the channel bit rate.

The equalizer 14 eliminates the intercode interference derived from the band limit characteristics and so forth of the magnetic recording channel. A digital signal processing circuit can be realized by employing, e.g., a transversal type linear equalizer or the like.

The digital PLL circuit 16 synchronizes with the phase Pk of the data existence point on the basis of the signal sample Sk obtained by the use of a fixed-frequency clock signal. Since the detail of the digital PLL circuit 103 is disclosed in the aforementioned U.S. patent application Ser. No. 07/963,905, an explanation thereof is given here briefly with its schematic constitution shown in FIG. 6.

Referring to FIG. 6, an instantaneous phase calculator 50 receives, as an input, a sampled value Sk of the channel playback signal at a time t=kTs. On the basis of two successive signal samples obtained by using the fixed-frequency clock signal nonsynchronously with the input signal data, the instantaneous phase calculator 50 produces an instantaneous phase ΔPk as an output which represents the time from the existence time t=kTs of the signal sample Sk back to the signal waveform zero-crossing (candidate for 0° phase) in the kth time slot. The unit of such output is the quantized phase number.

The instantaneous phase ΔPk is the distance from the 0° phase having a phase value 0 to the time kTs and represents the value obtained on the basis of the time t=kTs. On the phase, 360° corresponds to a digital value $2^{NPLL}$. The time Ts of one time slot width corresponds to 180° on the phase, which is equal to a digital value $2^{NPLL-1}$ with respect to the quantized phase number regarded as a unit. The instantaneous phase ΔPk is calculated on an assumption that the signal waveform between the successive two samples Sk and Sk−1 can be linearly approximated. The instantaneous phase ΔPk is added, as the phase data ΔPk is added, as the phase data ΔPk of NPLL bits, in an adder 51 to the phase Pk−1 outputted from an internal phase register 56. The output of the adder 51 is multiplied by a modification coefficient α in a multiplier 53 and then is supplied to one input terminal of an AND gate 54.

Now an explanation will be given below with regard to a phase detector 52 for selecting the instantaneous phase data corresponding to the 0° phase. The instantaneous phase ΔPk is calculated whenever the signal waveform has a zero-crossing. Therefore, depending on the channel coding notation, there may occur such a situation that the instantaneous phase is the one calculated at a point different from a 0° phase where the data is essentially existent. In a partial response (hereinafter referred to as PRS) (1, 0, −1) or the like, there may be a zero-crossing in an opposite phase as well as in a 0° phase. It is accordingly necessary to select the calculated instantaneous phase output obtained only at the true 0° phase. Therefore, in the case of a PRS (1, 0, 1) for example, temporary data is first detected by a ternary level predictor 524, and a phase control signal generator 528 generates a phase control signal modify_Pk relative to the instantaneous phase ΔPk decided to be a 0° phase on the basis of such temporary data. And the phase control signal modify_Pk is supplied to the other input terminal of the AND gate 54. Consequently, only the detected instantaneous phase ΔPk (accurately, the output of the multiplier 53) alone is supplied via the AND gate 54 to the adder 55 and then is added to the output phase Pk−1 of the register 56.

Both the 0° phase data and the effective signal Vk are supplied to the 0° sample interpolator 15 as the data that represents the position of the 0° phase data existence point in the time slot.

A plurality of adders and multipliers are included in the feedback loop of the digital PLL circuit shown in FIG. 6, so that a total of the calculation delay time amounts to a great value (e.g., 30 to 40 nanoseconds). It is difficult in the feedback loop to execute a pipeline process, and the calculation in the loop needs to be completed within one sampling time. Therefore the calculation delay time is dominant to determine the minimum possible value of the sampling interval.

And an ACS (add-compare-store) loop included in the Viterbi decoder for updating the degree of likelihood limits the maximum value of the sampling interval similarly to the above.

Accordingly, even if the channel bit rate needs to be raised by increasing the linear density on the recording medium, there arises a problem that the rate is restricted by the speed of the circuit elements.

OBJECT AND SUMMARY OF THE INVENTION

It is an object of the present invention to provide an improved digital signal processing circuit which is capable of raising the transmission rate of a playback channel despite an increase of the time required to execute a desired signal process such as demodulation.

According to one aspect of the present invention, there is provided a digital signal processing circuit which comprises a memory means for storing a digital signal obtained from a playback channel; a control means for writing the digital signal in the memory means at a first rate and reading out the digital signal from the memory means at a second rate lower than the first rate; and a processing means for executing a desired process relative to the digital signal read out from the memory means.

In such a digital signal processing circuit, the playback channel is a partial response channel associated with a disk.

The signal processing circuit further comprises an A-D converter for converting the analog signal obtained from the playback channel into a digital signal. The A-D converter is disposed in the preceding stage of the memory means and is driven in accordance with a first clock signal of a fixed frequency, and the processing means is driven in accordance with a second clock signal of another fixed frequency lower than that of the first clock signal. The control means generates a read/write control signal and a read/write address signal in response to the first fixed-frequency clock signal, the second fixed-frequency clock signal, a sector index signal and a data read command signal.

The processing means includes an equalizer for equalizing the digital signal, an interpolator for interpolating the 0° phase data on the basis of the digital signal, and a decoder for decoding the digital signal with the maximum likelihood. Meanwhile the control means includes a first counter for counting the pulses of the first fixed-frequency clock signal to generate a write address signal; and a second counter for counting the pulses of the second fixed-frequency clock signal to generate a read address signal.

In the digital signal processing circuit of the constitution mentioned above, the digital signal is written in the memory means at a first rate by the control means and is read out therefrom at a second rate which is lower than the first rate. And then a desired process is executed relative to the digital signal thus read out from the memory means. Therefore the required signal processing rate may be lower than the transmission rate of the playback channel. Consequently, it becomes possible to raise the transmission rate of the playback channel despite the condition that the time required for the desired signal process such as demodulation is rendered longer.

Furthermore, due to the circuit constitution where the desired signal process for the digital signal written in the memory means at the first rate is read out therefrom at the lower second rate, the transmission rate of the playback channel can be raised in conformity with an increase of the disk recording density.

The above and other features and advantages of the present invention will become apparent from the following description which will be given with reference to the illustrative accompanying drawings.

DESCRIPTION OF THE PREFERRED EMBODIMENT

Figure 1:
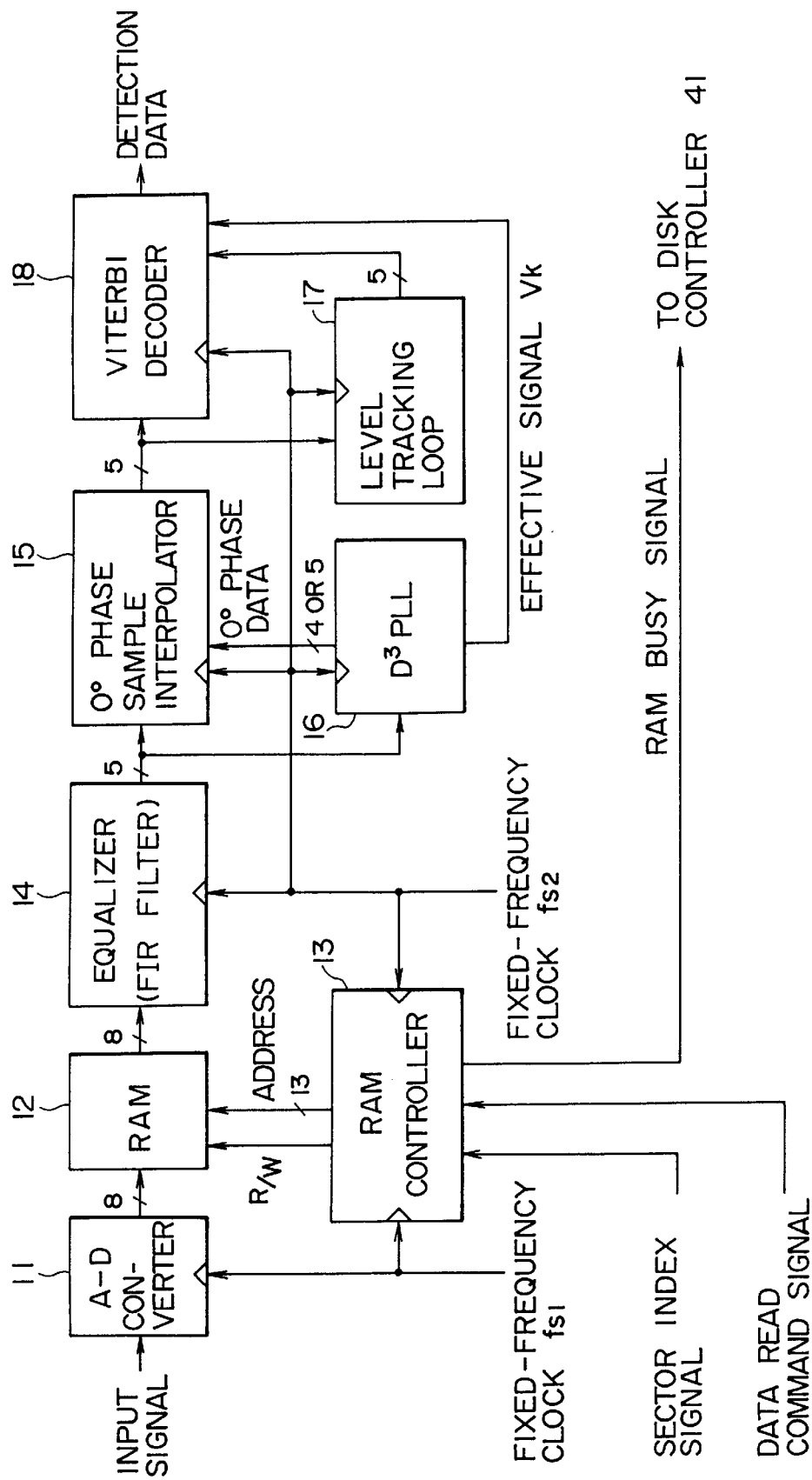
FIG. 1 is a block diagram of a preferred embodiment representing the digital signal processing circuit of the present invention applied to a data demodulator of a magnetic disk apparatus.

FIG. 1 is a block diagram of a preferred embodiment which represents an exemplary case of applying the digital signal processing circuit of the present invention to a data demodulator. Prior to describing this embodiment, an explanation will be given on a digital magnetic disk recording/playback apparatus where the present invention is applicable.

Figure 4:
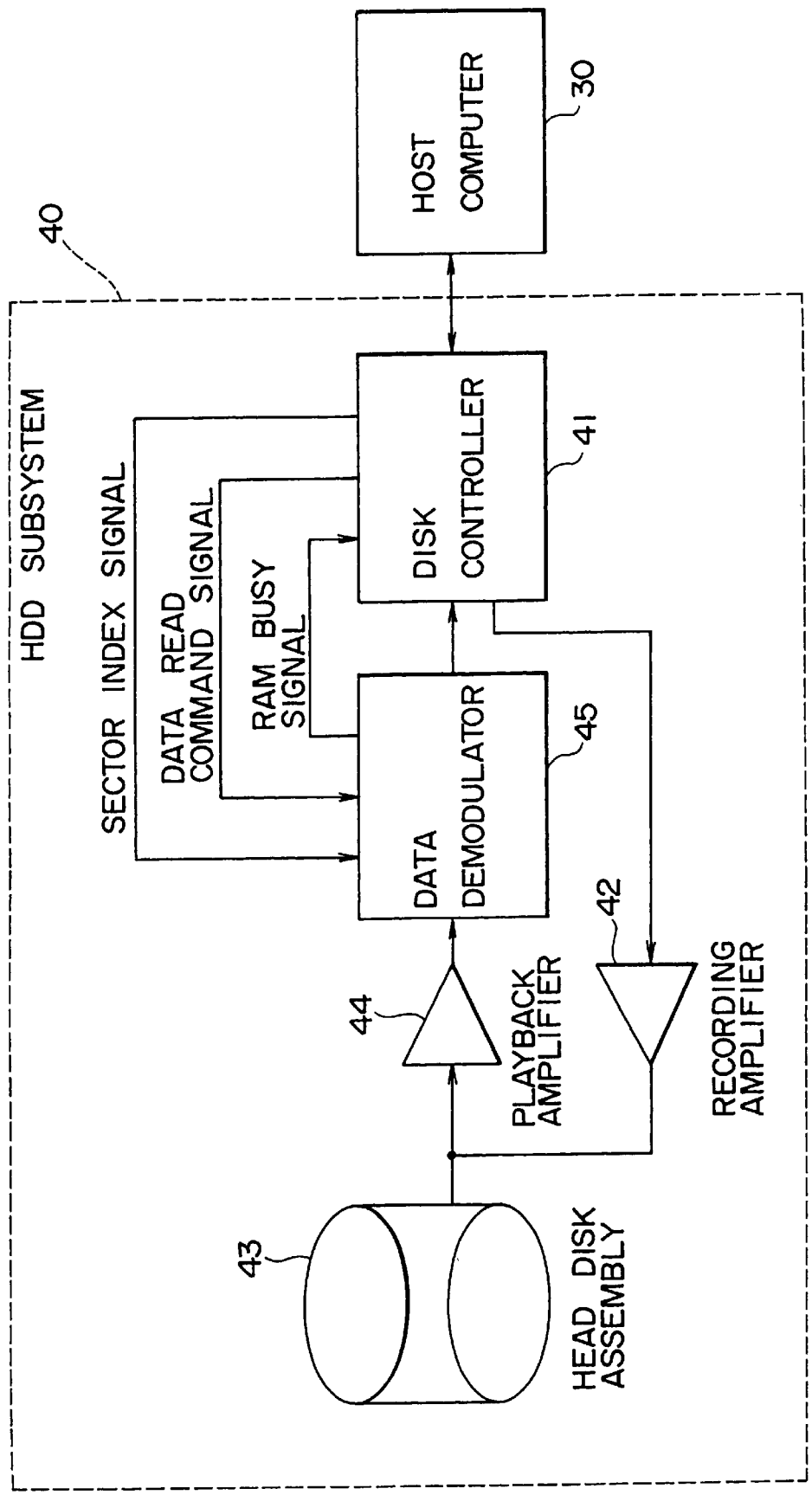
FIG. 4 is a block diagram showing an exemplary constitution of a magnetic head disk recording/playback apparatus.

FIG. 4 is a block diagram of a digital magnetic disk recording/playback apparatus viewed from the flow of data. In a recording mode where data from a host computer 30 is recorded by a hard disk drive (HDD) subsystem 40, first the data is transferred from the host computer 30 via a bus interface to a magnetic disk controller 41 in the HDD subsystem 40, and then the data is arranged by the magnetic disk controller 41 in a predetermined format recordable on the magnetic disk. The data is so modulated as to conform with a magnetic recording/playback channel and then is supplied to a recording amplifier 42, which subsequently causes a recording current flow in a recording head incorporated in a head disk assembly 43 to thereby record the data. The head disk assembly 43 is a mechanical block consisting of a data recording magnetic disk, a recording/playback head, a head shift mechanism and a spindle motor.

In a data playback mode, the recorded magnetization pattern on the magnetic disk is reproduced therefrom by the magnetic playback head in the head disk assembly 43 and then is amplified by a playback amplifier 44 to become a playback signal, which is then demodulated to recover the former digital data in a data demodulator 45. Thereafter the digital data is supplied to the magnetic disk controller 41 which demodulates the channel modulation and rearranges the formatted data. And the digital data thus processed is supplied via the bus interface to the host computer 30.

Figure 5:
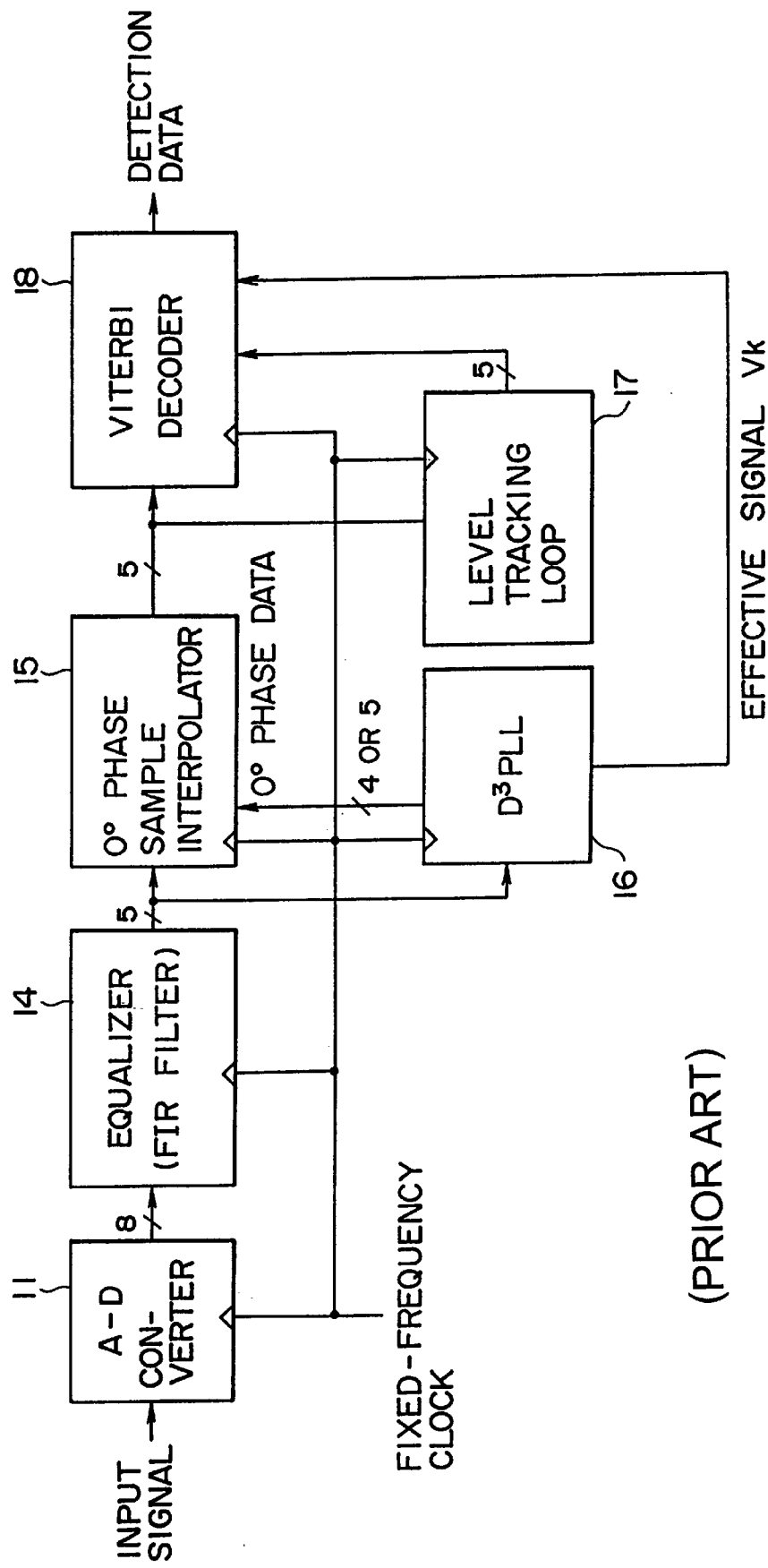
FIG. 5 is a block diagram showing an exemplary data demodulator employed in a conventional magnetic disk apparatus.
Figure 6:
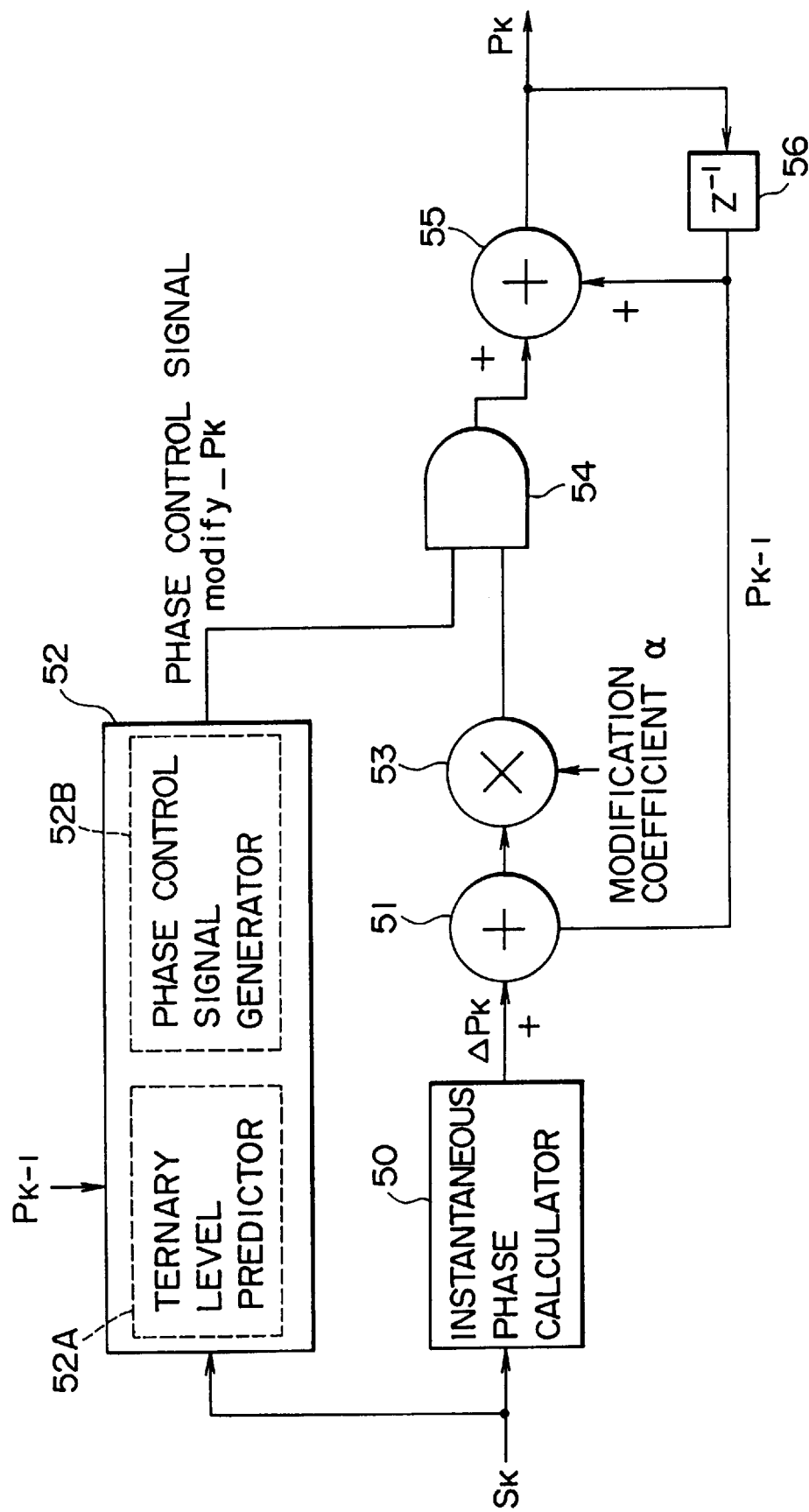
FIG. 6 is a block diagram of a bit synchronizing digital PLL circuit shown in FIG. 5.

The embodiment of FIG. 1 representing the digital signal processing circuit of the present invention is utilizable in the data demodulator 45 employed in the magnetic recording/playback apparatus of FIG. 4. In the embodiment of FIG. 1, an A-D converter 11, an equalizer 14, a 0° phase interpolator 15, a digital PLL circuit 16, a level tracking loop 17 and a Viterbi decoder 18 are the same as those shown in FIG. 5. The mere difference is such that the A-D converter 11 operates in accordance with a first fixed-frequency clock signal fs1; while the equalizer 14, the 0° phase sample interpolator 15, the digital PLL circuit 16, the level tracking loop 17 and the Viterbi decoder 18 operate in accordance with a second fixed-frequency clock signal fs2 whose frequency is lower than that of the first clock signal fs1.

The feature of the embodiment shown in FIG. 1 resides in the additional provision of a RAM 12 for storing the digital signal outputted from the A-D converter 11, and a RAM controller 13 for controlling the write and read actions relative to the RAM 12. An FIFO memory of a great capacity can be constituted by a combination of the RAM 12 and the RAM controller 13.

The RAM 12 is a dual port type with a write data input terminal and a read data output terminal provided independently of each other. The RAM employed in this embodiment has a data word width of 8 bits and an address word width of 13 bits, so that a storage capacity thereof amounts to $2^{13} \times 8$ bits=65,536 bits. Accordingly, there can be stored in the RAM 12 a batch total of 8192 samples obtained by sampling a sector, which includes data symbols of 512 bytes, at a rate of 2 samples per bit.

The RAM controller 13 feeds a read/write control signal R/W and a read/write address signal to the RAM 12. To the RAM controller 13, there are supplied both a first fixed-frequency clock signal fs1 and a second fixed-frequency clock signal fs2. As mentioned, the frequency of the second clock signal fs2 is set to be lower than that of the first clock signal fs1. To the RAM controller 13, there is also supplied a sector index signal from a servo circuit of the magnetic disk controller 41. The sector index signal consists of a pulse indicative of the start point of the sector. Furthermore a data read command signal with regard to one sector is supplied from the magnetic disk controller 41 to the RAM controller 13. The RAM controller 13 delivers to the magnetic disk controller 41 a RAM busy signal which signifies that the RAM is in use.

Figure 2:
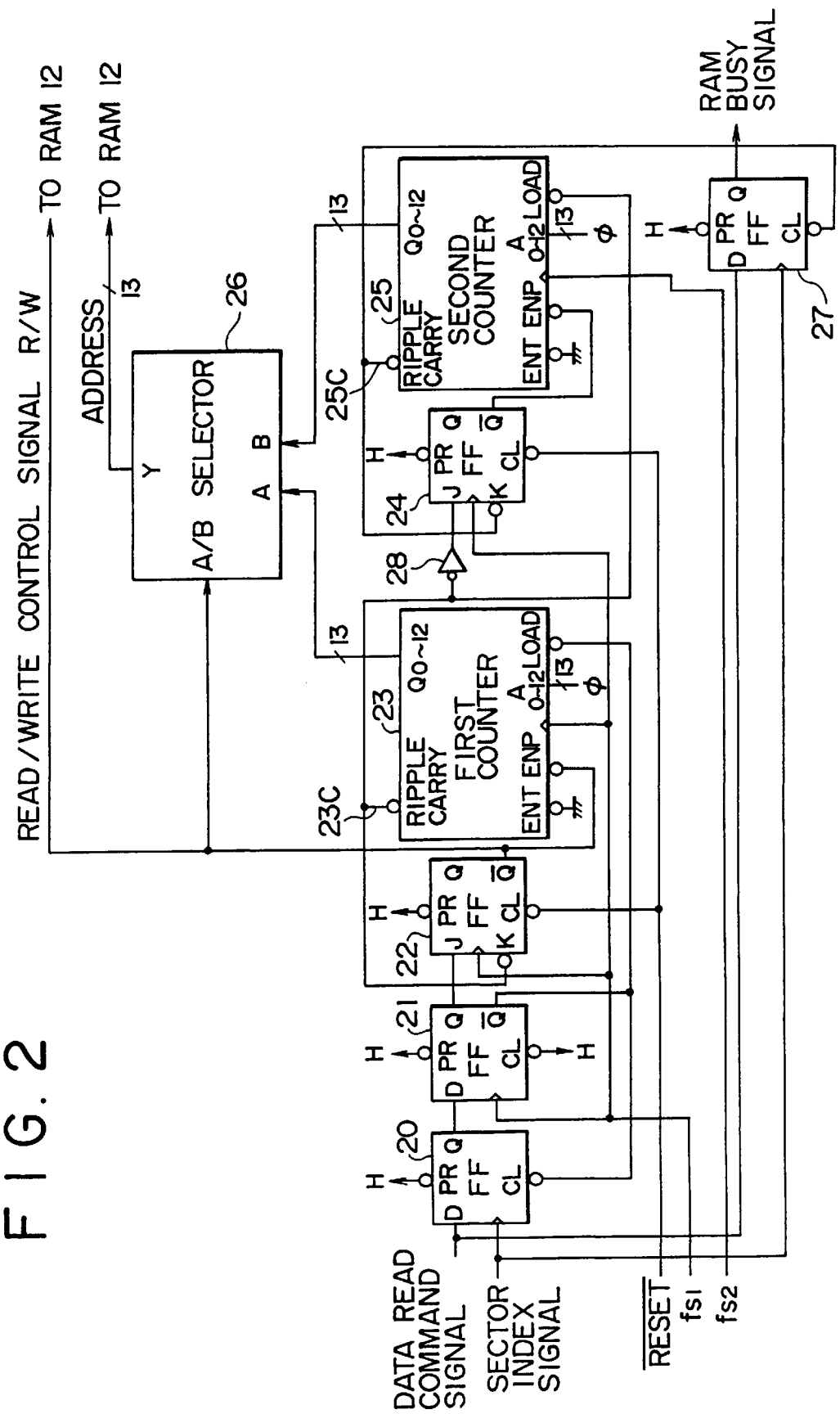
FIG. 2 is a block diagram showing an exemplary constitution of a RAM controller employed in the circuit of FIG. 1.

FIG. 2 shows an exemplary constitution of the RAM controller 13. A data read command signal is supplied from the magnetic disk controller 41 to a D input terminal of a D flip-flop 20 (SN74ALS74A made by Texas Instruments). And a sector index signal is supplied from the magnetic disk controller 41 to a clock input terminal of the D flip-flop 20. A Q output terminal of the D flip-flop 20 is connected to a D input terminal of a D flip-flop 21 (SN74ALS74A made by Texas Instruments). (Since SN74ALS74A incorporates two flip-flop circuits, the D flip-flops 20 and 21 are composed of a single IC.) And the first fixed-frequency clock signal fs1 is supplied to a clock input terminal of the D flip-flop 21.

The Q output terminal of the D flip-flop 21 is connected to a J input terminal of a JK flip-flop 22 (SN74ALS109A made by Texas Instruments), and an inverted Q output terminal of the D flip-flop 21 is connected to a clear input terminal of the D flip-flop 20 and also to a load input terminal of a first counter 23. The first fixed-frequency clock signal fs1 is supplied to a clock input terminal of the JK flip-flop 22. And an inverted reset signal is supplied to a clear input terminal of the JK flip-flop 22.

The inverted Q output of the JK flip-flop 22 is a read/write control signal R/W to the RAM 12 while serving also as a select control signal for an address selector 26. The inverted Q output of the JK flip-flop 22 is supplied also to an ENP terminal of the first counter 23.

The first fixed-frequency clock signal fs1 is supplied to the clock input terminal of the first counter 23. The outputs Q0 through Q12 of the first counter 23 are supplied to the address selector 26 to be used as write address signals to the RAM 12 as will be described later. A ripple carry 23C of the first counter 23 is supplied to both the K input terminal of the JK flip-flop 22 and a load terminal of a second counter 25 while being supplied also to a J input terminal of a JK flip-flop 24 (SN74ALS109A made by Texas Instruments). (Since SN74ALS109A incorporates two flip-flop circuits, the JK flip-flops 22 and 24 are composed of a single IC.)

The first fixed-frequency clock signal fs1 is supplied to the clock input terminal of the JK flip-flop 24, while the inverted reset signal is supplied to the clear input terminal thereof. The inverted Q output of the JK flip-flop 24 is supplied to the ENP terminal of the second counter 25. The first fixed-frequency clock signal fs1 is supplied to the clock input terminal of the second counter 25, while the second fixed-frequency clock signal fs2 is supplied to the ENT terminal thereof. The outputs Q0 through Q12 of the second counter 25 are supplied to the address selector 26 to be used as read address signals to the RAM 12 as will be described later. A ripple carry 23C of the first counter 25 is supplied to both the K input terminal of the JK flip-flop 24 and the clear input terminal of a status D flip-flop 27.

A data read command signal is supplied from the magnetic disk controller 41 to the D input terminal of the status flip-flop 27 (SN74ALS74A made by Texas Instruments), while a sector index signal is supplied from the magnetic disk controller 41 to the clock input terminal of the flip-flop 27. And a RAM busy signal is delivered from the Q output terminal of the status flip-flop 27.

Figure 3:
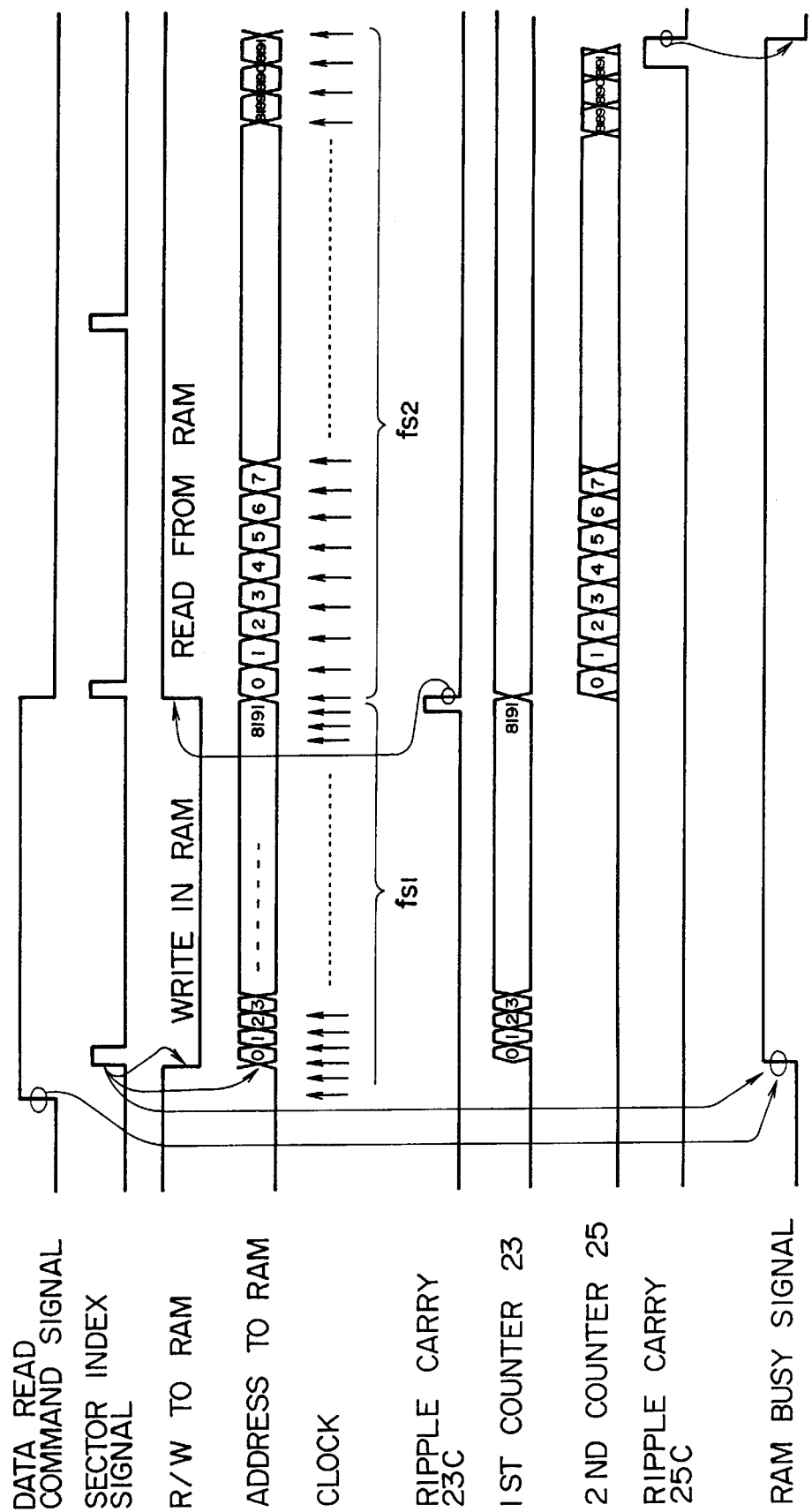
FIG. 3 is a timing chart of signals showing the operation of the RAM controller in FIG. 2.

FIG. 3 is a timing chart of signals for explaining an operation of the RAM controller 13 shown in FIG. 2. This operation represents an exemplary case of reproducing the data from one sector on a magnetic disk. It is assumed here that the RAM 12 is initially blank with no data stored therein, and also that the JK flip-flops 22 and 24 of the RAM controller 13 are cleared in an initialized state.

First a data read command signal for reading out the data from one sector is supplied from the magnetic disk controller 41 to the D input terminal of the D flip-flop 20. Upon supply of a sector index signal to the clock input terminal, the D flip-flop 20 is set to generate, together with the D flip-flop 21 in the next stage, a pulse having the same duration as that of the first fixed-frequency clock signal fs1.

Then a digital one-shot monostable multivibrator consisting of the JK flip-flop 22 and the first binary counter 23 is triggered in response to generation of such a pulse. First a numerical value 0 is loaded in the first counter 23, and thereafter the first counter 23 counts up in accordance with the first fixed-frequency clock signal fs1. Such count-up action is performed continuously until the output of the first counter 23 reaches 8191.

The inverted Q output of the JK flip-flop 22 is at a low level during the count-up action of the first counter 23, and is turned to a high level in synchronism with completion of the count. The inverted Q output of the JK flip-flop 22 is a read/write control signal R/W and, when being at a low level, it commands the RAM 12 to write the data. Meanwhile, when the control signal R/W is at a high level, it commands the RAM 12 to read the data.

The inverted Q output of the JK flip-flop 22 serves also as a select control signal for the address selector 26 and signifies that, when being at a low level, the counted value of the first counter 23 supplied to the input terminal A is to be outputted as a write address to the RAM 12. When being at a high level, the select control signal signifies that the counted value of the second counter 25 supplied to the input terminal B is to be outputted as a read address to the RAM 12. Since the inverted Q output of the JK flip-flop 22 is now at a low level, the counted value of the first counter 23 is supplied from the address selector 26 as a 13-bit write address to the RAM 12. Then the sample of the channel playback signal outputted from the A-D converter 11 is stored, at a high rate of the first fixed-frequency clock signal fs1, in the RAM 12 at the position indicated by the write address supplied from the selector 26.

When predetermined 8192 samples (sufficient for storing the playback signal of one sector) have completely been stored in the RAM 12, the first counter 23 halts its action of updating the address and then outputs a ripple carry 23C, whereby the inverted Q output of the JK flip-flop 22 is turned to a high level, and the operation proceeds from a write mode to a read mode.

After the sector designated for read by the magnetic disk controller 41, the data demodulator 45 performs a demodulation while reading out the signal samples from the RAM 12. In this operation, the read/write control signal R/W is at a high level which signifies a read mode. In this mode, the second counter 25 generates an address signal in accordance with the low-rate second fixed-frequency clock signal fs2, and the data read out from the RAM 12 is supplied to the equalizer 14. Thereafter the operations of bit synchronization and data detection are performed. The entire process of such demodulation is executed in accordance with the low-rate second clock signal fs2.

Upon completion of writing the samples in the RAM 12, the ripple carry 23C is outputted from the first counter 23 as a trigger to start the operation of the digital one-shot monostable multivibrator which consists of the JK flip-flop 24 and the second counter 25. In this state, the second counter 25 enabled by the low-rate second clock signal fs2 counts up at the frequency of the second clock signal fs2. Such count-up action is executed continuously unitl the count of an initial value 0 reaches 8191, during which the output of the second counter 25 is supplied as a read address signal to the RAM 12 via the selector 26.

The second counter 25 halts its action upon arrival of the counted value at 8191. Then the ripper carry 25C of the second counter 25 resets the status flip-flop 27 to thereby interrupt generation of the RAM busy signal being outputted to the magnetic disk controller 41.

The RAM controller 13 may be modified to a variety of constitutions in addition to the exemplary one shown in FIG. 2. Fundamentally, any constitution can be adopted if it meets the essential requirement of reading out the digital signal from the RAM 12 at a rate lower than the write rate.

Although a Viterbi decoder is employed as a data detector in the aforementioned embodiment, it may be replaced with a data detector of a different type which compares the data with a simple threshold level.

It is to be understood that the present invention is not limited merely to the above embodiment concerned with a data demodulator of a magnetic disk apparatus, and is widely applicable to any of various digital recording/playback apparatus.

Thus, according to the digital signal processing circuit of the present invention described hereinabove, a digital signal obtained from a playback channel is once written in a memory at a fixed rate and then is read out therefrom at a rate lower than the write rate, whereby the signal processing rate is settable to be lower than the signal transmission rate of the playback channel. Therefore, the transmission rate of the playback channel can be raised despite the condition that the time required for the desired signal processing operation such as demodulation is rendered longer. And since the speed of the circuit elements employed for demodulation or the like is reducible, it becomes possible to use lower-cost elements for constituting a desired circuit of a demodulator or the like.

Furthermore, due to the constitution where a digital signal from a playback channel for a disk is once written in a memory and then is read out therefrom at a rate lower than the write rate, the transmission rate of the playback channel can be raised in conformity with an increase of the recording density on the disk.

What is claimed is:

1. A digital signal processing circuit for processing data obtained from a playback channel, wherein a transmission rate of data from the playback channel is greater than a rate at which data can be processed comprising:

a memory means for storing a digital signal obtained from the playback channel;

a control means for writing the digital signal in said memory means at a first rate and reading out the digital signal from said memory means at a second rate lower than said first rate;

a processing means for executing a desired process relative to the digital signal thus read out from said memory means; and said control means comprising a first counter for counting pulses of a first fixed-frequency clock signal to generate successive write addresses for writing said memory means until one sector of data is written therein, and a second counter for counting pulses of a second fixed-frequency clock signal to generate addresses for reading said memory means automatically on completion of writing said one sector.

2. The digital signal processing circuit according to claim 1, wherein said playback channel is associated with a disk.

3. The digital signal processing circuit according to claim 1, wherein said playback channel is a partial response channel.

4. The digital signal processing circuit according to claim 1, further comprising an A-D converter for converting the analog signal obtained from said playback channel into a digital signal, said A-D converter being disposed in a preceding stage of said memory means and driven in accordance with a first clock signal of a fixed frequency; and said processing means is driven in accordance with a second clock signal of another fixed frequency lower than that of the first clock signal.

5. The digital signal processing circuit according to claim 1, wherein said control means generates a read/write control signal and the read/write address signal in response to the first fixed-frequency clock signal, the second fixed-frequency clock signal, a sector index signal and a data read command signal.

6. The digital signal processing circuit according to claim 1, wherein said processing means includes an equalizer for equalizing the digital signal.

7. The digital signal processing circuit according to claim 1, wherein said processing means includes an interpolator for interpolating the 0° phase data on the basis of the digital signal.

8. The digital signal processing circuit according to claim 1, wherein said processing means includes a decoder for decoding the digital signal with the maximum likelihood.

* * * * *